United States Patent
Stadelmann et al.

(10) Patent No.: US 9,568,602 B1
(45) Date of Patent: Feb. 14, 2017

(54) RADAR SYSTEM AND METHOD OF DUE REGARD/DETECT AND AVOID SENSING AND WEATHER SENSING

(71) Applicants: Scott W. Stadelmann, Shellsburg, IA (US); Jeffrey B. Bishop, Solon, IA (US); Brian J. Herting, Marion, IA (US); Stephen G. Carlson, Monticello, IA (US); John R. Moore, Cedar Rapids, IA (US); Bryan N. Wesner, Marion, IA (US)

(72) Inventors: Scott W. Stadelmann, Shellsburg, IA (US); Jeffrey B. Bishop, Solon, IA (US); Brian J. Herting, Marion, IA (US); Stephen G. Carlson, Monticello, IA (US); John R. Moore, Cedar Rapids, IA (US); Bryan N. Wesner, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 308 days.

(21) Appl. No.: 14/498,539

(22) Filed: Sep. 26, 2014

(51) Int. Cl.
*G01S 13/95* (2006.01)
*G01S 7/28* (2006.01)
*G01S 13/02* (2006.01)

(52) U.S. Cl.
CPC ............. *G01S 13/953* (2013.01); *G01S 7/28* (2013.01); *G01S 2013/0254* (2013.01)

(58) Field of Classification Search
CPC ... G01S 13/953; G01S 7/28; G01S 2013/0254
USPC .................... 342/26 R, 26 A–26 D
See application file for complete search history.

(56) References Cited

U.S. PATENT DOCUMENTS

| | | | | |
|---|---|---|---|---|
| 5,311,183 | A * | 5/1994 | Mathews | G01S 13/953 342/26 B |
| 5,831,570 | A * | 11/1998 | Ammar | F41G 7/2226 342/149 |
| 5,907,568 | A * | 5/1999 | Reitan, Jr. | G01S 7/22 342/181 |
| 6,236,351 | B1 * | 5/2001 | Conner | G01S 7/2813 342/26 B |
| 6,388,608 | B1 | 5/2002 | Woodell et al. | |
| 7,205,928 | B1 * | 4/2007 | Sweet | G01S 13/953 342/118 |
| 8,466,846 | B1 | 6/2013 | Elsallal et al. | |
| 9,019,145 | B1 * | 4/2015 | Sishtla | G01S 13/953 342/159 |
| 9,182,485 | B1 * | 11/2015 | Andrews | G01S 13/953 |
| 9,297,896 | B1 * | 3/2016 | Andrews | G01S 13/953 |

* cited by examiner

*Primary Examiner* — John B Sotomayor
(74) *Attorney, Agent, or Firm* — Donna P. Suchy; Daniel M. Barbieri

(57) ABSTRACT

A radar system and a method can utilize a radar antenna, such as, an active electronically scanned array antenna. The radar system can include a processor configured to scan a volume of space via the radar antenna to detect aircraft threats and to detect weather threats. The processing system can utilize a first pattern to detect the aircraft threats or obstacles and a second pattern to detect the weather threats.

20 Claims, 5 Drawing Sheets

RADAR SYSTEM AND METHOD OF DUE REGARD/DETECT AND AVOID SENSING AND WEATHER SENSING

The present disclosure relates generally to radar systems including but not limited to radar systems with weather sensing and detect and avoid (DAA)/due regard (DR) capability.

Weather threats can pose significant risks to aircraft, especially small aircraft and unmanned vehicles. Ground-based weather sensors generally do not cover all areas associated with aircraft flight, and information from ground-based weather sensors may be delayed or inaccurate at the altitudes associated with the aircraft. On board weather radar systems provide the highest confidence level for sensing weather and avoiding weather threats.

U.S. Pat. No. 5,311,183 discloses an aircraft weather radar system. Conventional aircraft weather radar systems are capable of scanning for certain weather phenomena, such as wind shear, turbulence, convective weather, areas of high rainfall rate or micro-burst situations. U.S. Pat. No. 6,388,608 assigned to the assignee of the present application and incorporated herein by reference discloses a weather radar system with wind shear detection capabilities. U.S. Pat. No. 6,388,608 discloses an embodiment that detects turbulence, micro-bursts or wind shear by scanning at two or more tilt angles using a radar antenna and determining wind speeds at various elevations. Wind shear, turbulence or micro-burst warnings are generally desirous when the airplane is in the landing, taxi and take-off modes. Identification of areas of convective weather or high rainfall rate are of interest for all phases of flight Due regard radar (DR) systems and detect and avoid (DAA) radar systems allow unmanned aerial vehicles and other aircraft to detect aircraft in an area that could be a collision threat. Due regard radar and detect and avoid radar (DR) systems generally use on board radar or other on board sensors to detect aircraft.

Radar systems, such as weather radar systems, due regard radar systems and detect and avoid radar systems contribute to the size, weight and power of aircraft. Size, weight and power requirements are particularly strict on unmanned aerial vehicles and small aircraft.

Thus, there is a need for due regard/detect and avoid radar systems and weather radar systems that require less size, weight and power. Further, there is a need for combining due regard/detect and avoid radar functions with weather sensing functions to reduce size, weight and power requirements as well as cost. There is also need for architecture for effecting simultaneous or near simultaneous weather and other aircraft detection. There is also a need to improve weather detection using simultaneously or near simultaneously transmitted radar beams at different altitude levels. There is also a need for a single aperture radar system that provides weather detection and due regard/detect and avoid functions. There is also a need for a radar system and process that takes advantage of an active electronically scanned array (AESA) antenna for due regard/detect and avoid capabilities and weather sensing capabilities. Further, there is a need for a cost effective weather and aircraft detection system for use with smaller antennas, such as electronically scanned antennas. There is also a need for a system that can achieve rapid revisit rates and large field of view requirements for due regard/detect and avoid functions that can exceed the capability of conventional mechanically scanned antenna implementations.

SUMMARY

In one aspect, the inventive concepts disclosed herein are directed to a method of using an airborne radar. The method includes providing a first radar pulse pattern for weather detection simultaneously or near simultaneously at a first elevation and a second elevation using an active electronically scanned antenna array, and receiving first radar returns associated with the first elevation and second radar returns associated with the second elevation using the active electronically scanned antenna array. The method also includes detecting weather using data associated with the first radar returns and the second radar returns, whereby errors associated with time sample differences are reduced due to providing the first radar pulse pattern at the first elevation and the second elevation simultaneously or near simultaneously In a further aspect, the inventive concepts disclosed herein are directed to a radar system coupled to a radar antenna. The radar system includes a pulse generation circuit comprising a due regard/detect and avoid pulse generation module and a weather detection pulse generation module and a radar receiving circuit comprising a weather radar receive module and a due regard/detect and avoid receive module. The same radar system components may be dynamically configured for either weather or due regard/detect and avoid pulses in some embodiments.

In a further aspect, the inventive concepts disclosed herein are directed to a single aperture active electronically scanned array antenna-based radar system including a single aperture active electronically scanned array antenna and a processor. The processor is configured to scan a volume of space using the single aperture active electronically scanned array antenna to detect aircraft threats and to detect weather threats. The processor utilizes a first pulse pattern to detect the aircraft threats and a second pulse pattern to detect the weather threats.

In yet another aspect, the inventive concepts disclosed herein are directed to a method of using airborne radar. The method include providing a first radar pulse pattern for weather detection simultaneously or near simultaneously at a first elevation and a second elevation using an active electronically scanned antenna array, receiving first radar returns associated with the first elevation and second radar returns associated with the second elevation using the active electronically scanned antenna array, and detecting weather using data associated with the first radar returns and the second radar returns. The method also includes providing a second radar pulse pattern for due regard/detect and avoid functions using the active electronically scanned antenna array, and receiving third radar returns associated with the second pulse pattern using the active electronically scanned antenna array, and detecting other aircraft using data associated with the third radar returns.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
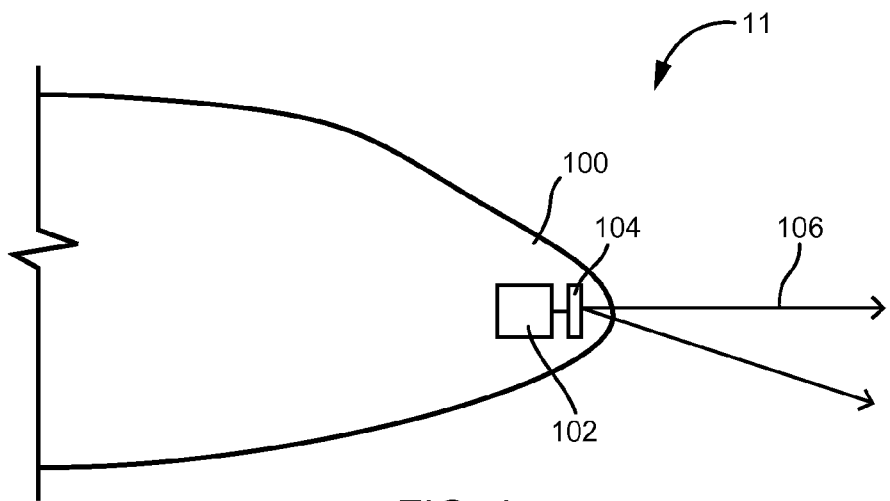
FIG. 1 is a partial side view schematic illustration of an aircraft including a radar system having due regard/detect and avoid and weather detection capabilities according to an exemplary embodiment.

Before describing in detail the particular improved system and method, it should be observed that the invention includes, but is not limited to a novel structural combination of data/signal processing components and sensing circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In some embodiments, systems and methods can meet a common requirement for unmanned aerial systems as well as manned aircraft. The common requirement involves the provision of a detect and avoid/due regard radar capability that allows detection of non-cooperative airborne targets within civil air space. The common requirement also involves the provision of a weather detection capability in some embodiments. The detection of non-cooperative airborne targets within civil airspace and the detection of weather can be provided to the remote pilot in an unmanned aircraft or to an onboard pilot in a manned aircraft who can make avoidance, mission, continuance, or modification decisions.

Systems and methods advantageously provide the due regard/detect and avoid capabilities and weather detection capabilities in a single radar system in some embodiments. The single radar system can be utilized in non-manned or manned aircraft in some embodiments. In some embodiments, combining a due regard/detect and avoid radar system with a weather radar system into a single sensor system reduces the size, weight and power required as well as reduces costs. In addition, the single radar system can provide enhanced vertical scans and enhanced MULTI-SCAN™ weather radar processes to increase the performance of the weather radar detection capability and detection of other aircrafts. In some embodiments, by using simultaneous multiple scans, better ground clutter rejection is achieved due to less time difference between upper and lower scans. In some embodiments, the radar system utilizes an active electronically scanned array antenna.

The term due regard/detect and avoid radar as used in this disclosure refers to radar that performs a due regard function, a detect and avoid function, or both a due regard function and a detect and avoid function. The term is intended to encompass both a due regard radar systems and detect and avoid radar systems as individual systems or as combined systems.

Referring to FIG. 1, a partial illustration of an aircraft 11 is shown. The aircraft 11 is a manned or unmanned vehicle in one or more embodiments. The aircraft 11 and/or a remote station can include a display that may be configured to show weather, terrain, fixed obstacles, variable obstacles (e.g., other aircraft), flight characteristics (e.g., altitude or speed), or any combination thereof sensed by a radar system 102 onboard aircraft II.

The radar system 102 is generally located inside a nose of the aircraft 11. The radar system 102 can be used on other vehicles (e.g., ordinance, missiles, drones, naval vehicles or terrestrial vehicles) besides aircraft without departing from the scope of the invention. According to some exemplary embodiments, the radar system 102 may be located at the top of the aircraft 11, on the bottom of the aircraft 11, on the tail of the aircraft 11, or distributed on multiple portions of the aircraft 11. In an exemplary embodiment, the radar system 102 can be a radar system that is adapted to sense weather phenomena and detect other aircraft in the vicinity of the aircraft 11.

The radar system 102 can include or be coupled with a radar antenna 104. The radar antenna 104 is a relatively small antenna in some embodiments. In some embodiments, the radar antenna 104 is an active electronically scanned array antenna or an active phase antenna. In some embodiments, the radar antenna 104 is suitable for smaller aircraft, business and regional systems (BRS) aircraft or unmanned vehicles (e.g., the radar antenna 104 can have an 18 inch diameter or less).

Advantageously, the radar system 102 can be utilized to sense a variety of weather phenomenon, including but not limited to precipitation, wind shear, convective cells and other hazards, using the radar antenna 104. An electronic or mechanical steering mechanism or combination thereof can be used to steer the radar antenna 104 according to azimuth angles and tilt angles. According to one embodiment, the radar system 102 is capable of providing transmit pulses with independent beam shapes and beam directions during a radar scan 106. In some embodiments, the radar antenna 104 provides a set of pulses, beams or sub-beams. The set of pulses can be provided simultaneously or near simultaneously or sequentially in one or more embodiments. The time for radar antenna 104 to switch beam positions is very small (e.g., 1 microsecond or less in some embodiments, such as, active electronic scanning array embodiments).

The radar system 102 can use signal encoding techniques to differentiate returns from each independent pulse during the radar scan 106 in one embodiment. Robust target editing techniques are used on the returns to remove side lobe targets and ground targets to reduce false alarms in one or more embodiments. Target editing can be an angle based processes that are similar to in-range editing processes that are done for high spectral targets (e.g. spectral width editing for ground moving targets or moving propellers/turbines in a single range resolution cell) in some embodiments.

In some embodiments, the radar system 102 provides the set of pulses and receives returns using an active electronically scanned array antenna as the radar antenna 104. The radar antenna 104 can include an array of individual steerable elements in some embodiments. The elements can be coupled to solid state transmit/receive modules. The transmit/receive modules can provide signals at different frequencies or with different coding in some embodiments. Beams can be aimed from the radar antenna 104 by emitting separate radio waves from each element that interfere constructively at certain angles in front of the radar antenna 104 in some embodiments. The radar antenna 104 can be steered by using phase delay circuits or time delay circuits in one or more embodiments. In one embodiment, the radar antenna 104 can include or be used with two or more pulse generators and two or more receivers.

The radar antenna 104 can be embodied as a multi-channel two dimensional array in one or more embodiments. The radar antenna 104 can be utilized to point electronically at angles in one dimensional or two dimensional space. For example, multiple beams may be aimed from the radar antenna 104 (e.g. AESA antenna) by simultaneously or near simultaneously providing waves on multiple channels so that the waves interfere constructively at certain angles in front of the radar antenna 104. The radar antenna 104 can include various components including apertures, power amplifiers, phase shifters, time delay circuits, transmit/receive switches, temperature sensing equipment, multiplexers, radio frequency power amplifiers, and phase sensing components in some embodiments. In some embodiments, the two dimensional array of the radar antenna 104 for the radar system 102 can be circular, cylindrical, spherical, etc., and can be an arbitrarily curved surface and can be conformal to a vehicle surface (e.g. the aircraft 11).

In some embodiments, the radar antenna 104 can be implemented as a balanced antipodal Vivaldi aperture (BAVA). In some embodiments, array elements in the antenna 104 are implemented as a dual polarization array, such as, the array shown in U.S. Pat. No. 8,466,846, incorporated herein by reference in its entirety. The radar antenna 104 can be constructed in accordance with the teachings of U.S. patent application Ser. No. 14/300,055, U.S. patent application Ser. No. 14/300,074 and U.S. patent application Ser. No. 14/300,021, incorporated herein by reference in their entities.

Figure 2:
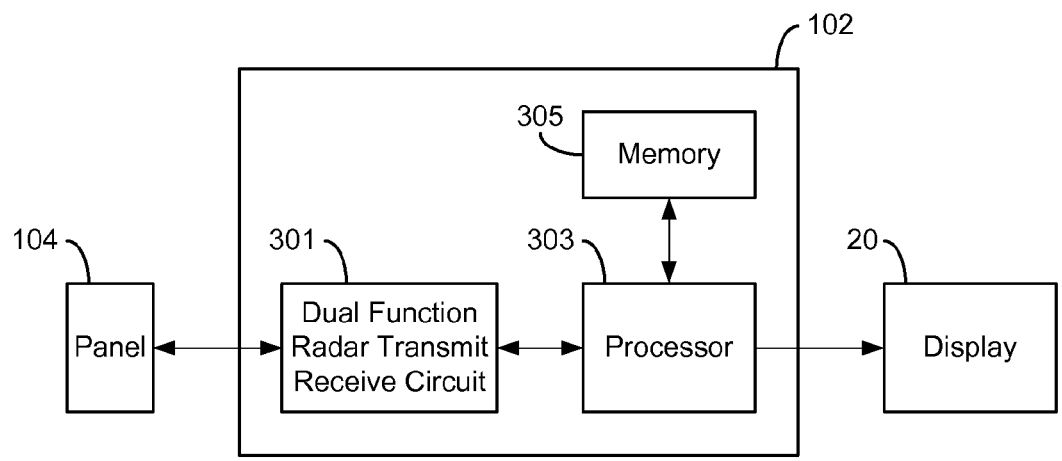
FIG. 2 is a block diagram of the radar system illustrated in FIG. 1.

Referring to FIG. 2, the radar system 102 includes a processor 303, a memory 305, and a dual function transmit/receiver circuit 301 in one or more embodiment. An optional display 20 can be provided. In one embodiment, the processor 303 controls the radar antenna 104 via the dual function transmit/receive circuit 301 to provide pulses for each sensing function using the radar antenna 104. Although the radar system 102 is discussed below as an avionic radar system, the radar system 102 can also by a ground-based or naval based radar system. The principles of the invention and the beams sets and patterns described herein can be used on other platforms including terrestrial and marine platforms without departing from the scope of the invention.

In one or more embodiments, the dual function radar transmit/receive circuit 301 provides hardware components for processing radar (e.g., radio frequency) signals on multiple channels for a weather detection functions and for due regard/detect and avoid functions. Data associated with radar returns received by the radar antenna 104 are provided to the processor 303 from the dual function transmit/receive circuit 301 in one or more embodiments. The processor 303 receives data associated with radar returns for weather detection and processes the data for weather phenomena detection in one or more embodiments. The processor 303 also receives data associated with radar returns for due regard/detect and avoid capability and processes the data for obstacle (e.g., other aircraft) detection in one or more embodiments.

The memory 305 can store the data associated with the radar returns and software for weather detection and obstacle detection executed on the processor 303. The processor 303 and the dual function radar transmit/receive circuit 301 can be embodied by a hardware platform similar to the MULTISCAN hardware platform or other weather radar type hardware platform configured as described herein. In one or more embodiments, the radar system 102 can be combined or integrated with other aircraft systems.

The dual function transmit/receiver circuit 301 is used to provide steering control signals and radar signals to the radar antenna 104 in one or more embodiments. The steering control signals and radar signals can cause the radar antenna 104 to simultaneously or near simultaneously provide two or more radar pulses or beams that have independent beam directions. The radar pulses or beams are configured for weather sensing or obstacle sensing in one or more embodiments. Radar returns associated with the radar pulses or beams are received by the radar antenna 104. The radar pulses are X-band or C-band radar signals and the radar returns are in the X-band and C-band in one or more embodiments.

Figure 3:
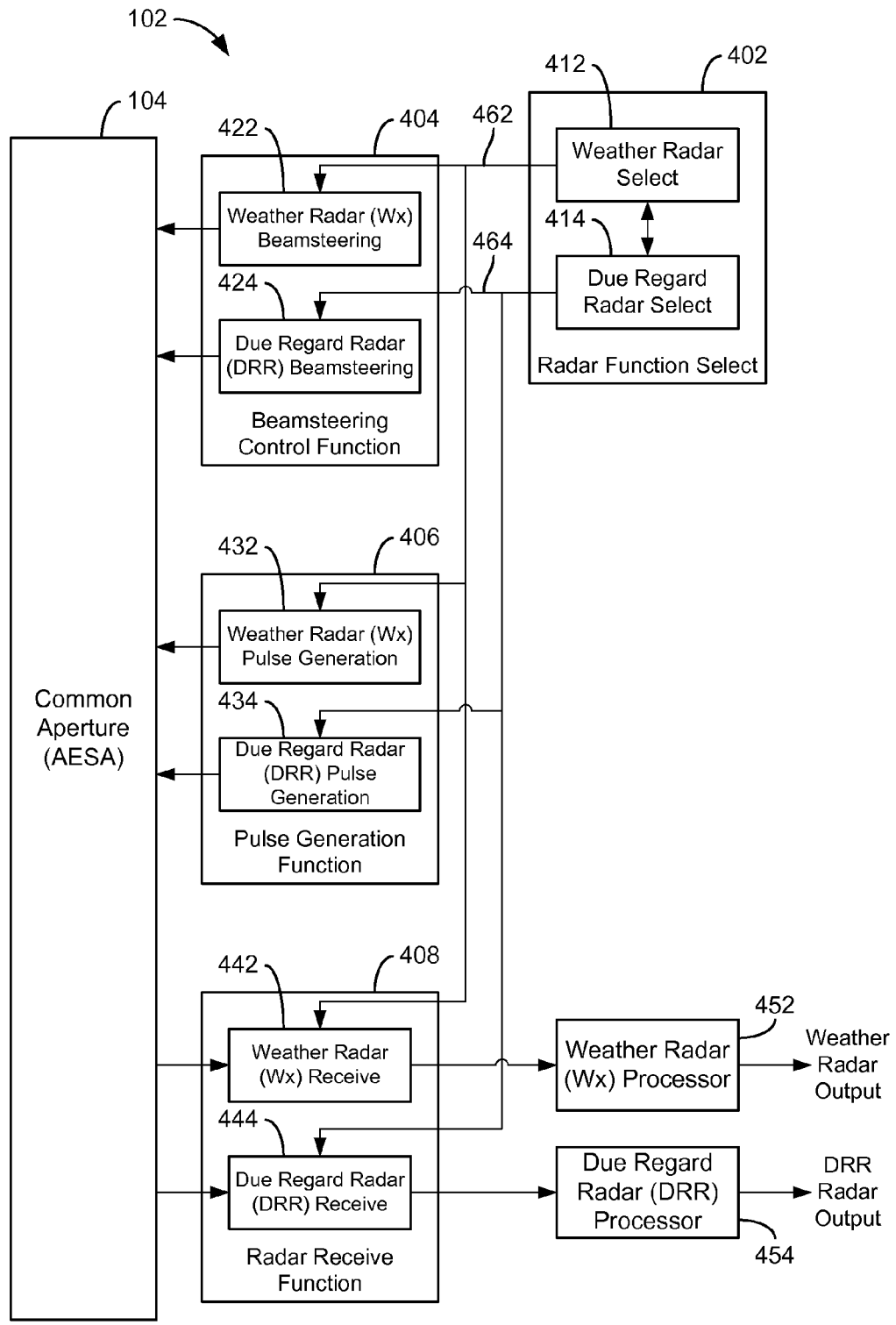
FIG. 3 is a block diagram of the weather radar system illustrated in FIG. 2.

With reference to FIG. 3, the radar system 102 includes hardware and software configured to provide a radar function select module 402, a beam steering control function module 404, a pulse generation function module 406, a radar receiving function module 408, a weather radar processing module 452 and a due regard/detect and avoid processing module 454. The beam steering control function module 404, the pulse generation function module 406, and the radar receiving function module 408 can be part of the dual function radar transmit/receive circuit 301 (FIG. 2) in some embodiments. The radar function select module 402, the weather radar processing module 452 and the due regard/detect and avoid processing module 454 can be executed on the processor 303 (FIG. 2) in some embodiments. Further, one or more of the radar function select module 402, the beam steering control function module 404, the pulse generation function module 406, the radar receiving function module 408, the weather radar processing module 452 and the due regard/detect and avoid processing module 454 can be embodied as hardware or software associated with both the processor 303 and the dual function radar transmit/receive circuit 301. In some embodiments, the operations of the radar function select module 402, the beam steering control function module 404, the pulse generation function module 406, the radar receiving function module 408, the weather radar processing module 452 and the due regard/detect and avoid processing module 454 are effected on a common hardware platform.

The radar function select module 402 includes a weather radar select module 412 and a due regard/detect and avoid select module 414. The radar function select module 402 coordinates the operation of the radar system 102 in a weather sense mode and an object sense mode (e.g., a due regard/detect and avoid mode). In one embodiment, the radar function select module 303 can cause the radar system 102 to enter the weather sense mode and the object sense mode interstitially. Alternatively, other timing arrangements can be utilized.

The weather radar select module 412 can provide or control weather sense mode parameters for weather sensing, including but not limited to parameters for scan patterns, azimuth, elevation, beam shapes, modulation type, pulse repetition frequency, frequency band, receive processing, and range in one or more embodiments. The due regard/detect and avoid select module 414 can provide or control object sense mode parameters for object sensing, including but not limited to parameters for scan patterns, azimuth, elevation, beam shapes, modulation type, frequency band, pulse repetition frequency, receive processing, and range in one or more embodiments.

The radar function select module 402 can select operations and modes in response to detection of obstacles and weather threats. For example, if other aircraft or obstacles are present in the area, more time may be spent in the object sense mode so that obstacles can be sensed and tracked without delay or latency due to entry into the weather sense mode. Alternatively, if a significant weather hazard is in the flight path or developing in the flight path of the aircraft 11 and objects are not present in the area, more time may be spent in the weather sense mode to enable further analysis of the weather threat.

In the weather sense mode, radar system 102 can employ an airplane rejection filter to reject the radar returns associated with the detection of airplanes, thereby preventing the display of airplanes on the weather radar screen. In some embodiments, radar system 102 retains data associated with the filtered radar returns for use in the object sense mode. The data can be provided for analysis according to due regard/detect and avoid functions. The data can be used to detect targets at longer range before they can be detected with due regard/detect and avoid pulses. The data can also be used to determine locations of other aircraft and cue the due regard/detect and avoid search in the object sense mode in some embodiments.

In the weather sense mode, the beam steering control function module 404 provides signals to the radar antenna 104 to steer the radar antenna 104 in accordance with a weather radar scan. In some embodiments, the weather radar beam steering control module 422 provides control and parameters for the weather radar scan. The weather radar beam steering control module 422 stores data and or algorithms for completing weather radar scans in one or more embodiments.

In some embodiments, the weather radar scan has a plus 60 degree to minus 60 degree azimuth range and is provided at least two elevation angles in one or more embodiments. The at least two elevation angles are between plus 50 and negative 50 degrees in some embodiments. The at least two elevation angles are approximately 0 degrees and negative 5 degrees in some embodiments. Other scan patterns can be utilized without departing from the scope of the invention.

In the object sense mode, the beam steering control function module 404 provides signals to the radar antenna 104 to steer the radar antenna 104 in accordance with a due regard/detect and avoid radar scan. In some embodiments, the due regard steering module 424 provides control and parameters for the due regard/detect and avoid radar scan. The due regard/detect and avoid beam steering control module 424 stores data and/or algorithms for the scans associate with due regard/detect and avoid operations in one or more embodiments.

In some embodiments, the due regard/detect and avoid scan has a plus 110 degree to minus 110 degree azimuth range and is provided at least two elevation angles in one or more embodiments. The at least two elevation angles are between plus 50 and negative 50 degrees in some embodiments. The at least two elevation angles are approximately 30 degrees and negative 30 degrees in some embodiments. In one or more embodiments, multiple elevation angles are provided for the scan pattern to provide enhanced data for weather hazard detection. In one or more embodiments, the scan pattern includes azimuth scans at every 10 degree elevation interval between plus and minus thirty degrees and are prioritized based upon proximity to 0 degrees elevation. Other scan patterns can be utilized without departing from the scope of the invention.

In the weather sense mode, the pulse generation function module 406 provides radar signals to the radar antenna 104 in accordance with a weather radar scan. The weather radar pulse generation module 432 provides the radar signal having a low pulse repetition frequency in one or more embodiments. The radar signal is suitable for long range sensing in one or more embodiments. The pulse repetition frequency is between 150-3000 hertz and the suitable range is approximately 320 nautical miles. Other pulse repetition frequencies and ranges can be utilized without departing from the scope of the invention. In one or more embodiments, the radar signals can be in the X-band, the C-band, or other radio frequency bands.

In some embodiments, the radar signal in the weather sense mode is provided as a wide main beam with less gain by using side lobe control. The side lobes can be tapered by providing more power to a center portion of the radar antenna 104 in one or more embodiments. Tapering the side lobes can reduces noise and reduces power to the target. In one or more embodiments, the side lobes are tapered at the side lobes by approximately 50 decibels (dBs) or 20 to 25 dBs. In one or more embodiments, the pulse generation function module 406 can adaptively change taper angles to affect side load levels, thereby suppressing side lobes levels in a direction. Other tapering techniques can be utilized without departing from the scope of the invention.

In the object sense mode, the pulse generation function module 406 provides radar signals to the radar antenna 104 in accordance with a due regard/detect and avoid scan. The due regard radar pulse generation module 434 provides the radar signal having a medium pulse repetition frequency in one or more embodiments. The radar signal is suitable for short range sensing in one or more embodiments. The pulse reputation frequency is above 4 kilohertz (KHz) (e.g., between 20 and 40 KHz or approximately 27 KHz) and the suitable range is less than 15 nautical miles (e.g., approximately 10 nautical miles). In some embodiments, the radar signal in the object sense mode is provided to provide a narrower main beam than the main beam in the weather sense mode. The radar signal in the object sense mode has a faster update rate than the radar signal in the weather sense mode. Other pulse repetition frequencies and ranges can be utilized without departing from the scope of the invention. In some embodiments, the radar signals for the weather sense mode have a different frequency range or modulation type than the radar signals for the object sense mode.

Radar returns associated with the radar signals in the weather sense mode are received via the radar antenna 104 by the radar receive function module 408. In the weather sense mode, weather radar returns are received through the weather radar receive module 442 which provides weather radar return data associated with the radar returns to the weather radar processing module 452. The weather radar receive module 442 can include filtering and/or demodulators for the band of radar signals in the weather sense mode and modulation type of the radar signals in the weather sense mode in one or more embodiments. The returns can be processed in accordance with a modulation technique associated with the radar signal. The weather radar processing module 452 processes the data in accordance with the weather radar detection schemes. Weather radar detection schemes can include those used by MULTISCAN weather radar systems or other weather radar systems.

Radar returns associated with the radar signals in the object sense mode are received via the radar antenna 104 by the radar receive function module 408. In the object sense mode, due regard/detect and avoid radar returns are received through the due regard/detect and avoid radar receive module 444 which provides due regard/detect and avoid radar return data associated with the radar returns to the due regard/detect and avoid radar processing module 454. The due regard/detect and avoid radar receive module 444 can include filtering and/or demodulators for the band of radar signals in the object sense mode and modulation type of the radar signals in the object sense mode in one or more embodiments. The returns can be processed in accordance with a modulation technique associated with the radar signal. The due regard/detect and avoid radar processing module 454 processes the data in accordance with object detection schemes.

The weather radar processing module 452 can benefit from utilizing simultaneously or near simultaneously provided weather radar signals and simultaneously or near simultaneously received weather radar returns in one or more embodiments. Rapid sampling of upper and lower radar beams reduces the impact of error sources, such as, aircraft data sources and latency during turns and dynamics in one or more embodiments. Reducing the time between upper and lower beam measurements reduces the effect of antenna pointing errors as there is very little time required for the radar antenna 104 to move between simultaneous scans in some embodiments. In addition, simultaneous sampling of multiple elevation beams provides enhanced data for hazardous weather detection in one or more embodiments.

In one embodiment, the radar system 102, the utilizing beam steering control function module 404, the pulse generation function module 406 and the radar receive function module 408 can provide radar signals and receive radar returns in rapid succession. Time required for steering a mechanical system is reduced by using the radar antenna 104 embodied as an active electronically steered array antenna in on or more embodiments.

Figure 4:
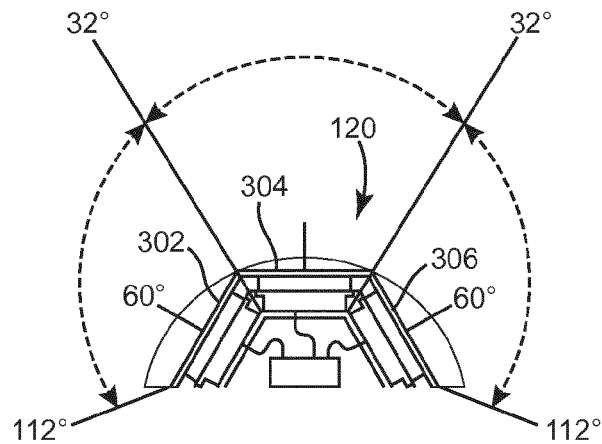
FIG. 4 is a planar top view schematic drawing of an exemplary embodiment of antenna including a center panel and two side panels for the radar system illustrated in FIG. 2.
Figure 5:
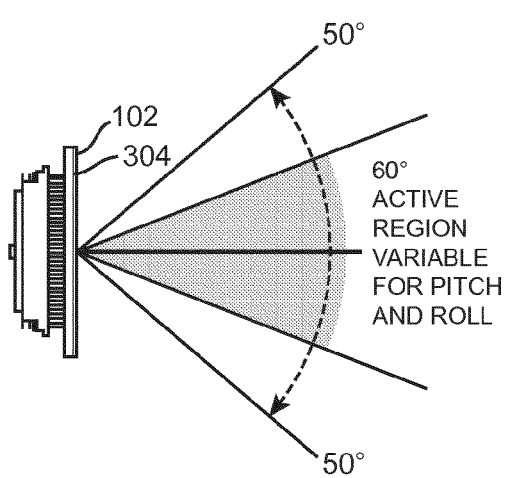
FIG. 5 is a planar side view schematic drawing of the center panel for the antenna illustrated in FIG. 4.

With reference to FIGS. 4 and 5, the radar antenna 104 includes at least one panel, such as a side panel 302, a center panel 304 and a side panel 306. The radar antenna 104 is configured as a three panel active electronically steered array antenna, where the side panel 302, the center panel 304 and the side panel 306 each include an array of antenna elements with supporting circuitry. In some embodiments, the center panel 304 and the side panels 302 and 306 are flat, planar panels.

The center panel 304 is disposed facing forward on the aircraft 11 (FIG. 1) and the side panels 302 and 306 are disposed at a 40-60 degree angle with respect to the center panel 304 in some embodiments. In some embodiments, the side panels 302 and 306 are arranged side by side and adjacent with respect to the center panel 304. Other orientations of the center panel 304 and the side panels 302 and 306 are possible.

The side panels 302 and 306 and the center panel 304 are disposed to provide a large field of view for sensing targets (e.g., weather or objects). The horizontal field of view is approximately 224 degrees (e.g., plus and minus 112 degrees) in some embodiments. The vertical field of view is between plus and minus 50 degrees (e.g., between plus and minus 30 degrees) in some embodiments. Generally, each panel of the center panel 304 and the side panels 302 and 306 provides a sufficient vertical field of view without requiring additional panels. In some embodiments, the active region of the vertical field of view is plus or minus 30 degrees. The field of view between positive 30 degrees and positive 50 degrees and between negative 30 degrees and negative 50 degrees is provided for pitch and roll adjustments associated with the orientation of the aircraft 11 (FIG. 1).

Figure 6:
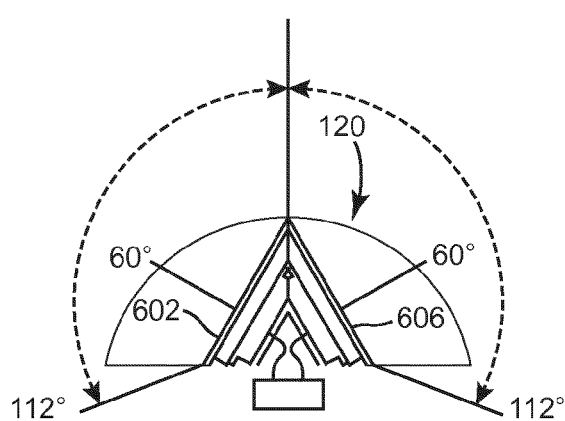
FIG. 6 is a top view schematic drawing of an exemplary embodiment of an antenna for the radar system illustrated in FIG. 1 including two panels.

With reference to FIG. 6, the radar antenna 104 includes a first panel 602 and a second panel 602. The first and second panels 602 and 606 are arranged side-by-side and adjacent with respect to each other. In some embodiments, the first and second panels 602 and 606 are placed in a V shape with the vertex towards the front of the aircraft 11 (FIG. 1) and defining an angle of approximately 40-60 degrees.

In some embodiments, the first and second panels 602 and 606 are arranged for a large horizontal field view. In some embodiments, the radar antenna 104 including the panels 602 and 606 provides a plus or minus 112 degree field of view in the horizontal domain and a plus or minus 30 degree vertical view in the vertical domain. In some embodiments, a 360 degree field view can be provided by the radar antenna 104.

Figure 7:
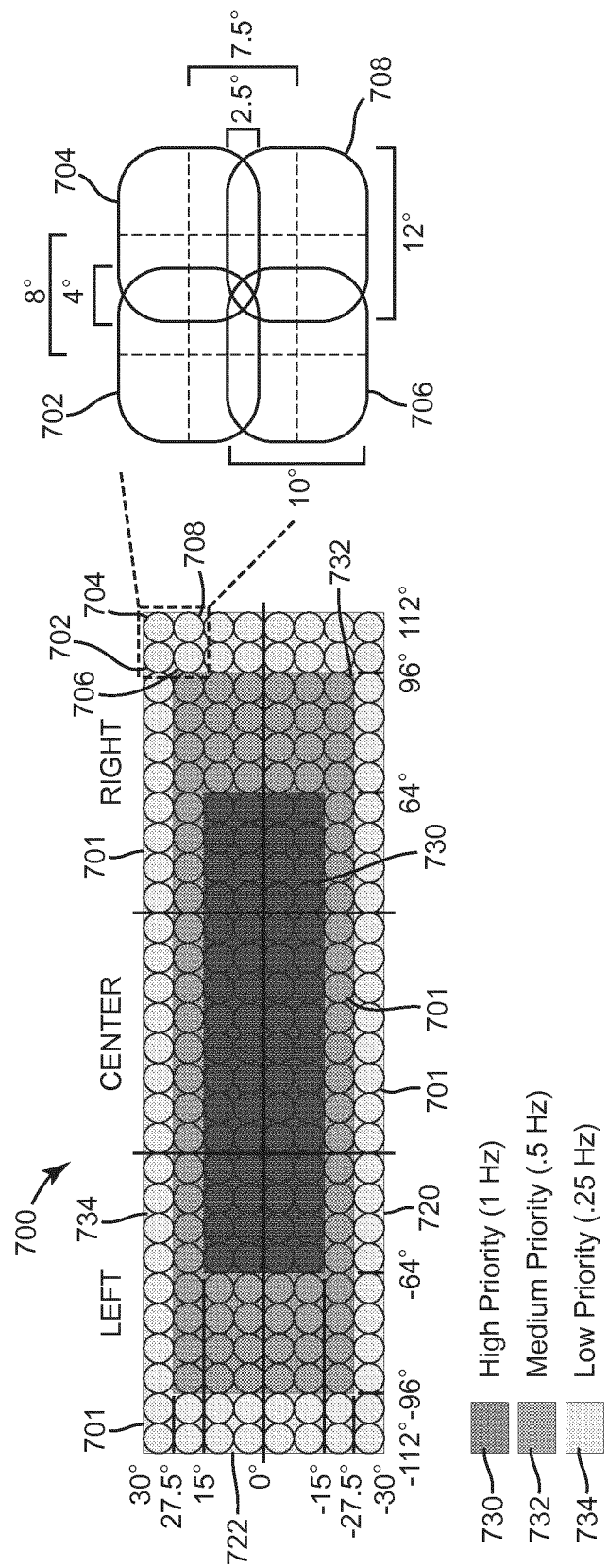
FIG. 7 is a schematic drawing illustrating scan rate and field of regard and beam spacing pattern for radar beams in an object sense mode for the radar system illustrated in FIG. 1 in accordance with yet another exemplary embodiment.

With reference to FIG. 7, the radar system 102 provides a scan pattern 700 for a due regard/detect and avoid radar scan in one or more embodiments. The scan pattern 700 has radar beams 701 provided at azimuth and elevation angles defined on an X axis 720 and a Y axis 722.

The radar beams 701 in a section 730 are high priority beams provided at a frequency of 1 Hz in one or more embodiments. The radar beams 701 in a section 732 are medium priority beams provided at a frequency of 0.5 Hz in one or more embodiments. The radar beams 701 in a section 734 are low priority beams provided at a frequency of 0.25 Hz in one or more embodiments. The radar beams 701 in section 730 are in an azimuth range of plus 64 to minus 64 degrees and an elevation range of plus 15 to minus 15 degrees in one or more embodiments. The radar beams 701 in section 732 are provided in an azimuth range of plus 96 to minus 96 degrees and an elevation range of plus 27.5 to minus 27.5 degrees in one or more embodiments. The radar beams 701 in section 734 are provided in an azimuth range of plus 112 to minus 112 degrees and an elevation range of plus 30 to minus 30 degrees in one or more embodiments.

The radar beams 702, 704, 706 and 708 are shown as radar beams in an upper right corner of the scan pattern 700. The azimuth spacing between the center of the radar beams 702 and 704 and between the center of the radar beams 706 and 708 is approximately 8 degrees in some embodiments. The azimuth width of the radar beams 702, 704, 706, and 708 is approximately 12 degrees in some embodiments. The azimuth overlap of neighboring radar beams 702 and 704 and neighboring radar beams 706 and 708 is approximately 4 degrees in some embodiments. The elevation spacing between the center of the radar beams 702 and 706 and between the center of the radar beams 704 and 708 is approximately 7.5 degrees in some embodiments. The elevation width of the radar beams 702, 704, 706, and 708 is approximately 10 degrees in some embodiments. The elevation overlap of neighboring radar beams 702 and 706 and neighboring radar beams 704 and 708 is approximately 2.5 degrees in one or more embodiments.

Figure 8:
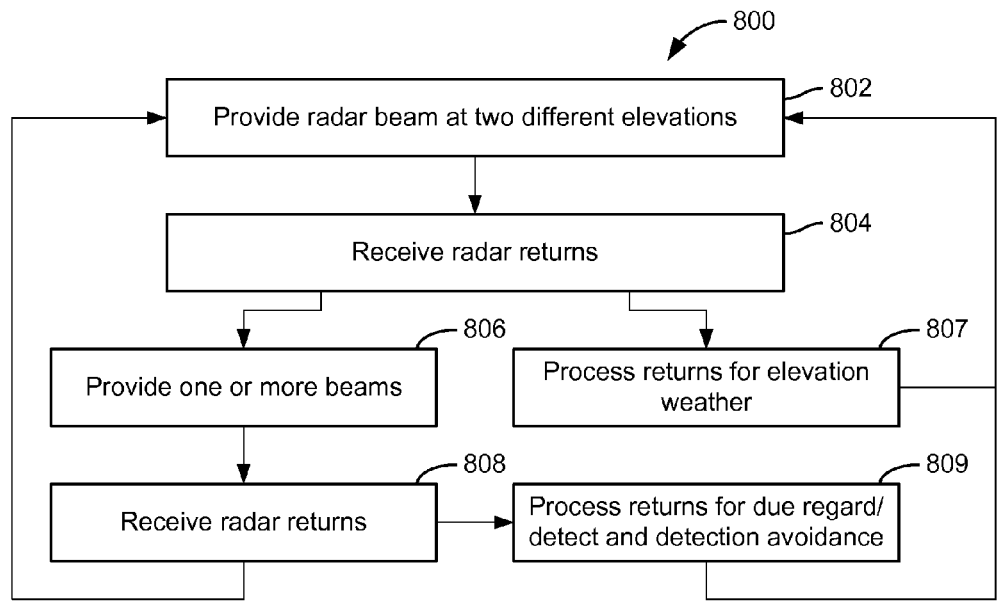
FIG. 8 is a flow diagram showing an exemplary embodiment of an operation of the weather radar system illustrated in FIG. 1.

With reference to FIG. 8, the radar system 102 (FIG. 1) can operate according to a flow diagram 800 in some embodiments. At an operation 802, radar beams are provided at two different elevations. The radar beams can be provided across an azimuth scan in one embodiment. At an operation 804, radar returns are received. At an operation 807, radar returns are processed for weather detection. After operation 807, the radar system 102 can return to operation 802 or advance to an operation 806 in one or more embodiments. Alternatively, operation 806 or 802 can be performed simultaneously or near simultaneously with an operation 807.

At operation 806, the radar system 102 provides one or more radar beams. At an operation 808, radar returns are received. At an operation 809, radar returns are processed for due regard/detect and avoidance. Operation 809 can be performed simultaneously or near simultaneously with operation 808 in one or more embodiments. In another embodiment, after operation 808, radar system 102 returns to operation 802. After operation 808, the radar system 102 can return to operation 806 in one or more embodiments.

Figure 9:
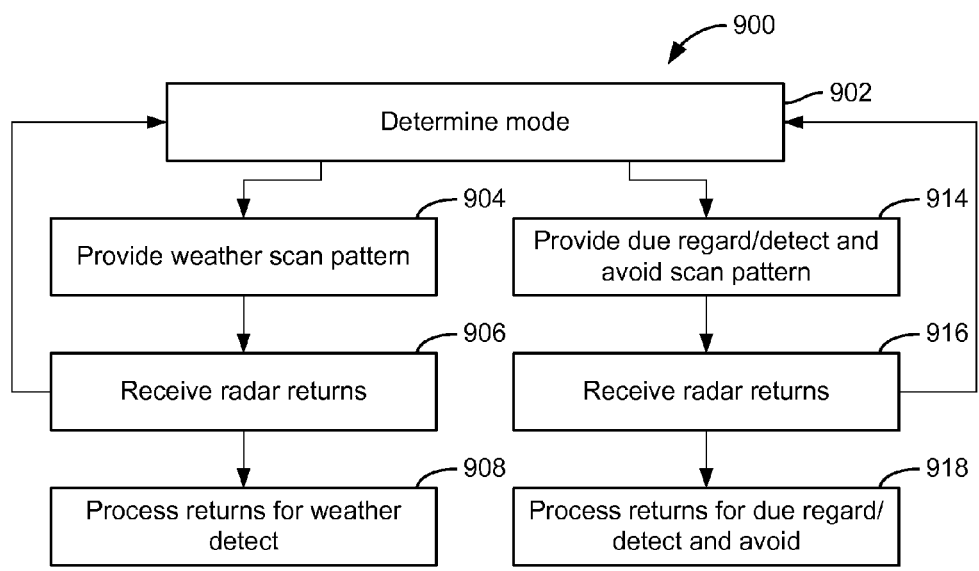
FIG. 9 is a flow diagram showing an exemplary embodiment of an operation of the weather radar system illustrated in FIG. 1.

With reference to FIG. 9, the radar system 102 can operate according to a flow diagram 900. At an operation 902, the radar system 102 determines whether to operate in a weather sense mode or an object sense mode in one or more embodiments. Various factors can be used to select the appropriate mode of operation including but not limited to phase of flight, obstacle in the area, weather conditions, or the most recent sensing operation. In one or more embodiments, weather sensing is performed for wind shear detection during takeoff.

In the object-sense mode, the radar system 102 provides a scan pattern such as the scan pattern 700 (FIG. 7) for object sensing. At an operation 916, the radar system 102 receives radar returns. After operation 916, the radar system 102 can return to operation 902 and determine whether the weather sense mode is needed or object sense mode is needed. At an operation 918, returns are processed for the object sense mode. If objects are detected in the vicinity of the aircraft 11 (FIG. 1), the radar system 102 may return to operations 914 and 916 to track the object.

In operation 902, the radar system 102 can determine to operate in the weather sense mode. In weather sense mode, the radar system 102 provides a weather scan pattern in an operation 904. Weather scan pattern can be provided at two or more elevations. At an operation 906, the radar system 102 receives weather radar returns. After operation 906, the radar system 102 can return to operation 902. In an operation 906, the radar system 102 can process returns for weather sensing.

In some embodiments, the ability of the active electronically scanned array antennas to direct beams to any desired location can be used to help solve the "busy radar" problem. A sparser scan pattern can be used to use less time in areas where little or no weather is present, or areas that have already been scanned recently. For example, 1 degree azimuth steps could be used instead of 0.25 degree azimuth steps when no weather is present or when areas have already been recently scanned. The use of larger azimuth steps frees up more radar resources for due regard/detect and avoid functions while meeting weather radar performance requirements.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps and signal types can be modified. The hardware and software configurations shown and described may differ depending on the chosen performance characteristics and physical characteristics of the computing devices. For example, the type of computing device, cans patterns, antenna type used may differ. Further, the configuration shown and described in the block diagram may be varied without departing from the scope of the invention. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of using an airborne radar, the method comprising:
   providing a first radar pulse pattern for weather detection simultaneously or near simultaneously at a first elevation and a second elevation using an active electronically scanned antenna array;
   receiving first radar returns associated with the first elevation and second radar returns associated with the second elevation using the active electronically scanned antenna array; and
   detecting weather using data associated with the first radar returns and the second radar returns, where errors associated with time sample differences are reduced due to the providing by the first radar pulse pattern at the first elevation and the second elevation simultaneously or near simultaneously.

2. The method of claim 1, further comprising:
   providing a second radar pulse pattern for due regard/detection and avoid functions using the active electronically scanned antenna array.

3. The method of claim 1, further comprising:
   providing the first radar pulse pattern at a third elevation simultaneously or near simultaneously with the providing at the first elevation and the second elevation; and
   receiving third radar returns associated with the third elevation.

4. The method of claim 1, wherein ground suppression is achieved using a difference between the first radar returns and the second radar returns.

5. The method of claim 1, wherein the method is performed on an unmanned aircraft.

6. The method of claim 1, further comprising:
   operating the active electronically scanned antenna array according to a first positioning algorithm when detecting the weather and according to a second positioning algorithm when detecting other aircraft.

7. The method of claim 2, wherein the first radar pulse pattern is for long range detection.

8. The method of claim 7, wherein the second radar pulse pattern is for shorter range detection with a faster update rate.

9. A radar system coupled to a weather radar antenna, the radar system comprising:
   a pulse generation circuit comprising a due regard/detect and avoid pulse generation module and a weather detection pulse generation module; and a radar receiving circuit comprising a weather detection receive module and due regard/detect and avoid receive module.

10. The radar system of claim 9, wherein the pulse generation circuit is comprised of signal processing hardware configured by the due regard/detect pulse generation and avoid module and the weather detection pulse generation module.

11. The radar system of claim 9, wherein the radar receiving circuit is comprised of signal processing hardware configured by the due regard/detect and avoid receive module and the weather detection receive module.

12. The radar system of claim 9, further comprising:
a radar processing circuit comprising a weather radar processing module configured to receive data from the weather radar receive module and a due regard/detect and avoid processing module configured to receive data from the due regard/detect and avoid receive module.

13. The radar system of claim 12, further comprising:
a beam steering control circuit comprising a weather radar control module and a due regard/detect and avoid control module.

14. The radar of claim 13, further comprising a radar function select circuit for selecting the operation in a first mode using the weather radar control module and in a second mode using the due regard/detect and avoid module.

15. The weather radar system of claim 9, wherein the weather radar antenna is an active electronically scanned array antenna.

16. The radar system of claim 9, wherein the radar antenna is an active electronically scanned array having a single aperture configured to receive signals from the pulse generation circuit and provide signals to the radar receiving circuit.

17. A single aperture active electronically scanned array antenna-based radar system, comprising:
a single aperture active electronically scanned array antenna;
a processor configured to scan a volume of space via the single aperture active electronically scanned array antenna to detect aircraft threats and to detect weather threats, wherein the processor utilizes a first pulse pattern to detect the aircraft threats and a second pulse pattern to detect the weather threats.

18. The single aperture active electronically scanned array antenna-based radar of claim 17, wherein the first pulse pattern is simultaneously or near simultaneously provided at least two elevations, wherein the aircraft detection and weather detection is performed in an interleaved fashion.

19. The single aperture active electronically scanned array antenna-based radar system of claim 17, wherein the processor uses a first antenna beam positioning algorithm for detecting aircraft threats and a second antenna beam positioning algorithm for detecting weather, the first antenna positioning beam algorithm being for a scan having a first azimuth range and a first elevation range, the second antenna beam positioning algorithm being for a scan having a second azimuth range and a second vertical range, the second azimuth range and the second vertical range being greater than the first azimuth range and the first elevation range, respectively.

20. The single aperture active electronically scanned array antenna-based radar system of claim 17, wherein the processor uses longer range detection for the weather threats and shorter range detection for other aircraft, wherein the shorter range detection has a faster update rate.

* * * * *